US012811704B2

(12) United States Patent
Wang et al.

(10) Patent No.: US 12,811,704 B2
(45) Date of Patent: Nov. 24, 2026

(54) CLOCK SKEW TRACKING METHOD BASED ON WEIGHTED OBSERVATION FUSION AND TIMESTAMP FREE INTERACTION

(71) Applicant: CHONGQING UNIVERSITY OF POSTS AND TELECOMMUNICATIONS, Chongqing (CN)

(72) Inventors: Heng Wang, Chongqing (CN); Rui Lu, Chongqing (CN); Zhengcen Peng, Chongqing (CN); Ping Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 376 days.

(21) Appl. No.: 17/791,918

(22) PCT Filed: Feb. 18, 2022

(86) PCT No.: PCT/CN2022/076844
§ 371 (c)(1),
(2) Date: Jul. 11, 2022

(87) PCT Pub. No.: WO2023/273363
PCT Pub. Date: Jan. 5, 2023

(65) Prior Publication Data

US 2024/0204895 A1 Jun. 20, 2024

(30) Foreign Application Priority Data

Jun. 28, 2021 (CN) ........................ 202110720874.4

(51) Int. Cl.
*H04J 3/06* (2006.01)
*H04L 67/12* (2022.01)

(52) U.S. Cl.
CPC ............ *H04J 3/0638* (2013.01); *H04L 67/12* (2013.01)

(58) Field of Classification Search
CPC ............................... H04J 3/0638; H04L 67/12
See application file for complete search history.

(56) References Cited

U.S. PATENT DOCUMENTS

2012/0263165 A1 10/2012 Zakrzewski et al.
2017/0042425 A1 2/2017 Ramlall et al.

FOREIGN PATENT DOCUMENTS

CN 110460553 A * 11/2019 ......... H04L 27/0014
CN 110572232 A 12/2019

(Continued)

OTHER PUBLICATIONS

Wang, Heng et al. "Estimation of Clock Skew for Time Synchronization Based on Two-Way Message Exchange Mechanism in Industrial Wireless Sensor Networks." IEEE transactions on industrial informatics 14.11 (2018): 4755-4765. Web. (Year: 2018).*

(Continued)

*Primary Examiner* — Catherine T. Rastovski
*Assistant Examiner* — Nyla Gavia
(74) *Attorney, Agent, or Firm* — Westbridge IP LLC

(57) ABSTRACT

The present invention relates to a clock skew tracking method based on weighted observation fusion and timestamp-free interaction, and belongs to the technical field of wireless sensor networks. The method comprises performing listening synchronization by an implicit node S within an overlapping communication range between a reference node and multiple active nodes, and after multiple pairs of timestamp-free communication messages are successfully over- (Continued)

heard, using multiple extended Kalman filtering algorithms to perform weighted fusion of multiple observed values on multiple obtained tracking results based on a scalar weighted linear minimum variance information fusion criterion, thus realizing timestamp-free relative skew fusion tracking of the implicit node. The present invention can not only dynamically track a relative clock skew on the basis of sending no message, but also reduce influence of a node with a relatively large tracking error on a listening node, thus robustness of skew tracking of the listening node is increased.

2 Claims, 3 Drawing Sheets

(56) References Cited

FOREIGN PATENT DOCUMENTS

| | | | | |
|---|---|---|---|---|
| CN | 111556559 | A | 8/2020 | |
| WO | WO2020147727 | A1 | 7/2020 | |
| WO | WO-2021118675 | A1 * | 6/2021 | ........ B60W 30/0956 |

OTHER PUBLICATIONS

Office Action of corresponding CN application 202110720874.4, published on Jan. 26, 2022.

Notice of Grant of Patent Right of corresponding CN application 202110720874.4, published on May 18, 2022.

The granted claims of corresponding CN application 202110720874.4.

Fei Yu, Research on Clock Synchronization Parameter Estimation Method Without Timestamp Interaction in Wireless Sensor Networks, China Excellent Master's Theses Full-text Database (Master's)—Information Science and Technology Series, Feb. 15, 2021, 136-935.

Heng Wang, et al., Clock skew estimation for timestamp-free synchronization in industrial wireless sensor networks. IEEE transactions on industrial informatics, 17(1), Feb. 20, 2020, 90-99.

Heng Wang, et al., Estimation of clock skew for time synchronization based on two-way message exchange mechanism in industrial wireless sensor networks. IEEE Transactions on Industrial Informatics, 14(11), Jan. 30, 2018, 4755-4765.

D.R. Kowalski, et al., Implementation and testing of a low-overhead network synchronization protocol. 2018 IEEE Aerospace Conference, Dec. 30, 2018, 1-8.

* cited by examiner

CLOCK SKEW TRACKING METHOD BASED ON WEIGHTED OBSERVATION FUSION AND TIMESTAMP FREE INTERACTION

FIELD OF INVENTION

The present invention belongs to the technical field of wireless sensor networks, and relates to a clock skew tracking method based on weighted observation fusion and timestamp-free interaction.

BACKGROUND ART OF THE INVENTION

Wireless sensor networks have been widely used in many fields such as biology and medical care due to characteristics such as self-organization, reliability and high fault tolerance. Many applications such as data fusion and resource scheduling in the wireless sensor networks need strict and uniform time references. Therefore, time synchronization is a basis for coordinating work of the wireless sensor networks. Timestamp-free synchronization is a synchronization protocol with a low power consumption proposed in recent years. This method requires no timestamp interaction, is easy to embed in a network data flow, and can reduce energy consumption for node synchronization. In addition, an implicit synchronization mechanism can complete self synchronization by listening for synchronization messages between neighbors. Such synchronization method with a very low power consumption is very important for the wireless sensor networks.

The implicit synchronization mechanism under timestamp-free interaction can complete self synchronization by listening for a timestamp-free communication message between a clock source and an active node, which is quite energy-saving and has been studied to some extent. However, most of the existing algorithms for tracking a clock skew of an implicit node under timestamp-free interaction only use a single pair of communication messages, therefore such studies still have some deficiencies: 1) in fact, multiple pairs of communication messages between the clock source and multiple active nodes will be overheard by the implicit node in a real network scenario; 2) the implicit node may incorrectly use paired communication messages with a relatively large time error, resulting in an oversize tracking error between the implicit node and a reference node and unstable tracking. Therefore, a new clock synchronization method for wireless sensor networks is urgently needed

DISCLOSURE OF THE INVENTION

In view of this, the purpose of the present invention is to provide a clock skew tracking method based on weighted observation fusion and timestamp-free interaction, which is based on a dynamic clock parameter of timestamp-free synchronization to make an implicit node use multiple pairs of timestamp-free communication messages between a reference node overheard and multiple active nodes, thus improving robustness of skew tracking of the implicit node.

To achieve the above purpose, the present invention provides the following technical solution:

A clock skew tracking method based on weighted observation fusion and timestamp-free interaction, comprising: performing listening synchronization by an implicit node S within an overlapping communication range between a reference node R and multiple active nodes $A_1, A_2, \ldots, A_L$, and after multiple pairs of timestamp-free communication messages are successfully overheard, using multiple extended Kalman filtering algorithms to perform weighted fusion of multiple observed values on multiple obtained tracking results based on a scalar weighted linear minimum variance information fusion criterion, thus realizing timestamp-free relative skew fusion tracking of the implicit node S.

Further, calculation formulas of the multiple extended Kalman filtering algorithms are:

$$\text{Prediction: } \hat{x}_k[n|n-1] = A\hat{x}_k[n-1|n-1]$$

$$\text{Predicted Minimum mean square error matrix: } M_k[n|n-1] = AM_k[n-1|n-1]A^T + C$$

$$\text{Kalman gain: } K_k[n] = \frac{M_k[n|n-1]H_k^T[n]}{\sigma_{Z_k}^2 + H_k[n]M_k[n|n-1]H_k^T[n]}$$

$$\text{Correction: } \hat{x}_k[n|n] = \hat{x}_k[n|n-1] + K_k[n](Q_k'[n] - h(\hat{x}_k[n|n-1]))$$

$$\text{Minimum mean square error matrix: } M_k[n|n] = (I - K_k[n]H_k[n])M_k[n|n-1]$$

Where, k represents a $k^{th}$ parallel extended Kalman filter executed, $\hat{x}_k[n|n-1]$ is the prediction of $\hat{x}[n]$ by considering a state matrix A and a previous round state $\hat{x}_k[n-1|n-1]$, and $M_k[n|n-1]$ is the predicted minimum mean square error matrix without observation correction; after the Kalman gain $K_k[n]$ is calculated, a corrected estimated value $\hat{x}_k[n|n]$ and the minimum mean square error matrix $M_k[n|n]$ can be obtained; I represents a unit matrix, H represents an observation matrix, C and $$\sigma_{Z_k}^2$$

are a state covariance matrix and an observation noise variance, $$Q_k'[n]$$

represents an observed value at time n, and $h(\hat{x}_k[n|n-1])$ represents an observed value without noise influence.

Further, the step of performing weighted fusion of multiple observed values on multiple obtained tracking results based on a scalar weighted linear minimum variance information fusion criterion specifically comprises following steps:

S1: Calculating an optimal information fusion matrix in the scalar weighted linear minimum variance information fusion criterion, and an expression is:

$$\hat{x}_{opt}[n|n] = a_1\hat{x}_1[n|n] + a_2\hat{x}_2[n|n] + L + a_L\hat{x}_L[n|n]$$

Where a represents an estimator component weight; and a fusion weight condition of $a_1+a_2+L+a_L=1$ can be obtained based on unbiased estimation;

S2: Obtaining an optimal mean square error matrix according to a fusion estimation error, and an expression is:

$$M_{opt}[n|n]=\sum_{k=1}^{L}a_k^2(M_k[n|n])$$

S3: Calculating a fusion performance evaluation parameter, and an expression is:

$$\Gamma=trM_{opt}[n|n]=tr\sum_{k,l=1}^{L}a_ka_l(M_{kl}[n|n])=\sum_{k=1}^{L}a_k^2[tr(M_k[n|n])]$$

Where tr represents a trace of the matrix, and $M_{kl}[n|n]$ represents a cross covariance. A problem of optimal fusion is transformed to selecting $a_1, a_2, \ldots, a_L$ to minimize $\Gamma$.

Further, the problem of optimal fusion is solved, i.e., $a_1, a_2, \ldots, a_L$ is selected to minimize $\Gamma$, which specifically comprises: using a Lagrange multiplier method to obtain an optimal weight of:

$$a_k=\frac{1}{trM_k[n|n]}\Big/\sum_{k=1}^{L}\frac{1}{trM_k[n|n]}$$

Defining $$\Lambda=\left(\frac{1}{trM_1[n|n]}+\frac{1}{trM_1[n|n]}+L+\frac{1}{trM_L[n|n]}\right)^{-1},$$

then the optimal information fusion matrix is expressed as:

$$\hat{x}_{opt}[n|n]=\sum_{k=1}^{L}\frac{\Lambda}{trM_k[n|n]}\hat{x}_k[n|n]$$

Clock skew tracking by weighted fusion of multiple observed values can be realized according to the optimal information fusion matrix obtained by calculation. Similarly, the optimal mean square error matrix is expressed as:

$$M_{opt}[n|n]=\sum_{k=1}^{L}\left(\frac{\Lambda}{trM_k[n|n]}\right)^2M_k[n|n].$$

Further, according to an internal relationship of clock skew among the active nodes, the reference node and the implicit node, a relative clock skew $\rho^{(SR)}$ between the reference node and the implicit node is estimated, the weighted observation fusion skew tracking of the implicit node is realized, and a specific internal relationship is:

$$1+\rho^{(SR)}=\frac{1+\rho^{(AR)}}{1+\rho^{(AS)}}$$

Where $\rho^{(AR)}$ represents a relative clock skew between the active nodes and the reference node, and $\rho^{(AS)}$ represents a relative clock skew between the active nodes and the implicit node.

The present invention has the following beneficial effects:

1) The present invention is oriented to a listening synchronization mechanism under timestamp-free interaction, which not only requires no timestamp transmission, but also can effectively track the dynamic clock skew without sending any message, thus the energy consumption for synchronization is reduced.

2) The present invention takes into account network characteristics that multiple pairs of communication messages between the reference node and the multiple active nodes will be overheard by the implicit node, and uses a data fusion technology to improve the robustness of the implicit synchronization, which has a practical significance to expand the application of the implicit synchronization in time synchronization.

3) The present invention can not only dynamically track a relative clock skew on the basis of sending no message, but also reduce influence of a node with a relatively large tracking error on a listening node, thus robustness of skew tracking of the listening node is increased.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Figure 1:
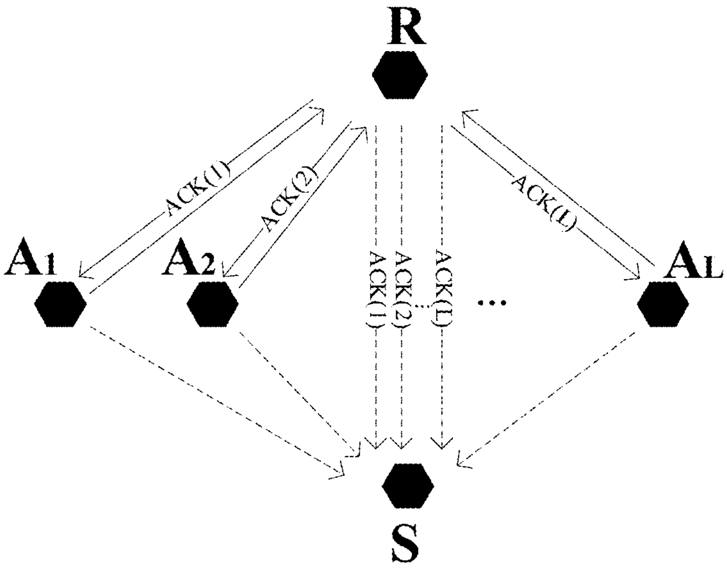
FIG. 1 is a schematic diagram showing that multiple pairs of communication messages between a reference node and multiple active nodes are overheard by an implicit node in the embodiment.
Figure 2:
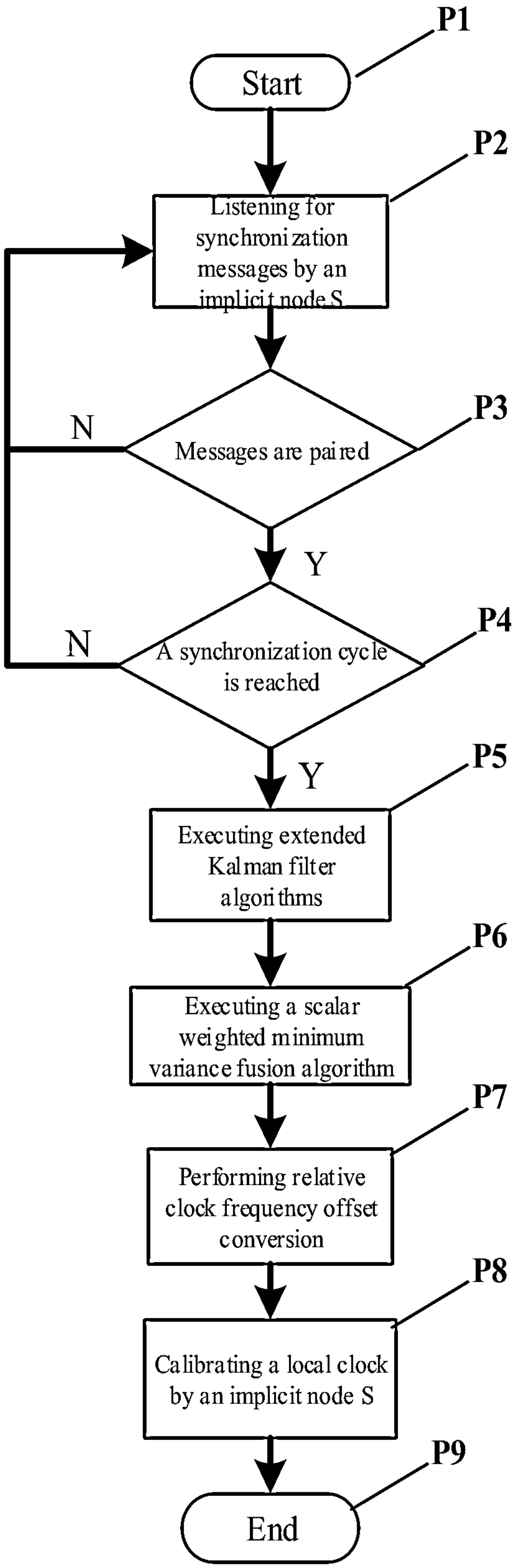
FIG. 2 is a flow chart of a weighted observation fusion clock skew tracking method in the embodiment.
Figure 3:
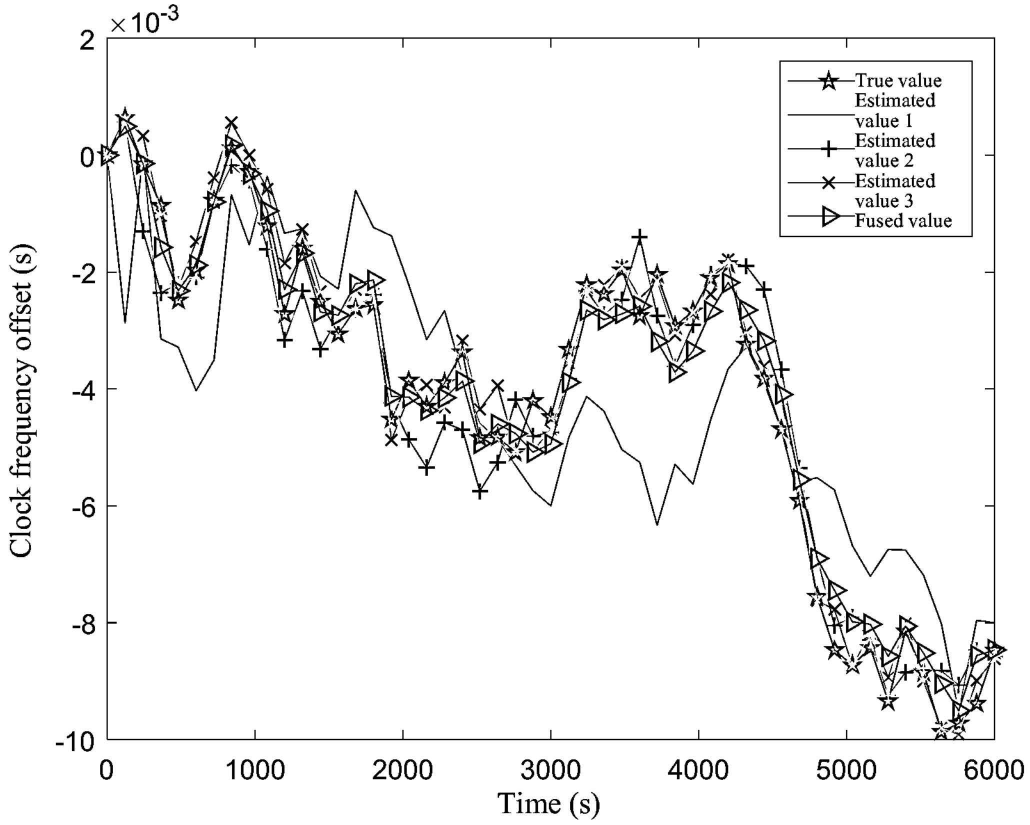
FIG. 3 is a performance comparison chart of a weighted observation fusion clock skew tracking method in the embodiment.

Referring to FIGS. 1-3, FIG. 1 is a schematic diagram showing that synchronization between a reference node and multiple active nodes is overheard by an implicit node provided in the embodiment. As shown in FIG. 1, node R serves as the reference node, nodes $A_1, A_2, \ldots, A_L$ are the active nodes, node S serves as the implicit node to perform a listening synchronization mechanism, multiple pairs of timestamp-free communication messages between the reference node R and the multiple active nodes are overheard by the implicit node S to perform tracking by weighted fusion of multiple observed values, and the specific steps are as follows:

A multi-observation equation as follows can be obtained according to an observation equation Q'[n]=h(x[n])+Z[n] of an implicit node skew tracking method under timestamp-free synchronization:

$$Q_k'[n] = h(x_k[n]) + Z_k[n] \tag{1}$$

Where $$h(x_k[n]) = \left(\rho_k^{(AR)} - \rho_k^{(AS)}\right)P_k[n] + \frac{\rho_k^{(AS)} - \rho_k^{(AR)}}{1 + \rho_k^{(AR)}} O_k[n].$$

ρ represents a relative skew between nodes, k represents a $k^{th}$ extended Kalman filter executed, and $Z_k[n]$ is a random delay subject to Gaussian distribution.

Similarly, a state equation as follows can be obtained according to a state equation x[n]=Ax[n−1]+u[n] of an implicit node skew tracking method under timestamp-free synchronization:

$$x_k[n] = Ax_k[n-1] + u[n] \tag{2}$$

Where $$x_k[n] = \begin{bmatrix} \rho_k^{(AS)}[n] \\ \rho_k^{(AR)}[n] \end{bmatrix}, \quad u[n] = \begin{bmatrix} u^{(AS)}[n] \\ u^{(AR)}[n] \end{bmatrix} \text{ and } A = \begin{bmatrix} m_1 & 0 \\ 0 & m_2 \end{bmatrix};$$

u[n] is a driving noise subject to $$N(0, \sigma_u^2),$$

and an update coefficient m is regarded as a known constant close to but not exceeding 1.

Based on equations (1) and (2), k extended Kalman filtering algorithms parallelly executed by the implicit node S are as follows:

$$\text{Prediction: } \hat{x}_k[n|n-1] = A\hat{x}_k[n-1|n-1] \tag{3}$$

$$\text{Predicted Minimum mean square error matrix: } M_k[n|n-1] = AM_k[n-1|n-1]A^T + C \tag{4}$$

$$\text{Kalman gain: } K_k[n] = \frac{M_k[n|n-1]H_k^T[n]}{\sigma_{Z_k}^2 + H_k[n]M_k[n|n-1]H_k^T[n]} \tag{5}$$

$$\text{Correction: } \hat{x}_k[n|n] = \hat{x}_k[n|n-1] + K_k[n]\left(Q_k'[n] - h(\hat{x}_k[n|n-1])\right) \tag{6}$$

$$\text{Minimum mean square error matrix: } M_k[n|n] = (I - K_k[n]H_k[n])M_k[n|n-1] \tag{7}$$

L skew estimators and a minimum mean square error matrix are obtained by the above extended Kalman filtering algorithms, and based on a scalar weighted linear minimum variance fusion criterion, a fusion process specifically comprises the following steps:

Optimal fusion tracking information can be expressed by a proportion of each component weight in the following form:

$$\hat{x}_{opt}[n|n] = a_1\hat{x}_1[n|n] + a_2\hat{x}_2[n|n] + L + a_L\hat{x}_L[n|n] \tag{8}$$

Where a represents an estimator component weight. The weight shall meet the condition of $a_1+a_2+L+a_L=1$ based on unbiased estimation.

A fusion estimation error is written as follows according to a definition:

$$\tilde{x}[n|n] = x_{opt}[n|n] - \hat{x}[n|n] = \sum_{k=1}^{L} a_k(x_{opt}[n|n] - \hat{x}_k[n|n]) = \sum_{k=1}^{L} a_k(\tilde{x}_k[n|n]) \tag{9}$$

An optimal mean square error is calculated as follows according to the fusion estimation error (9):

$$M_{opt}[n|n] = E(\tilde{x}[n|n]\tilde{x}[n|n]^T) = \sum_{k,l=1}^{L} a_k a_l (M_{kl}[n|n]) \tag{10}$$

In a real wireless sensor network environment, a cross covariance exists, but is small and difficult to capture, and calculation of the cross covariance will greatly increase the complexity of the algorithms. Therefore, no cross covariance is considered in the embodiment, i.e., it is considered that $M_{kl}[n|n]_{(k \neq l)}=0$. Based on the above condition, an optimal mean square error matrix can be expressed as:

$$M_{opt}[n|n] = \sum_{k=1}^{L} a_k^2(M_k[n|n]) \tag{11}$$

A fusion performance evaluation parameter is introduced:

$$\Gamma = trM_{opt}[n|n] = tr\sum_{k,l=1}^{L} a_k a_l (M_{kl}[n|n]) = \sum_{k=1}^{L} a_k^2[tr(M_k[n|n])] \tag{12}$$

Where tr represents a trace of the matrix. A problem of optimal fusion is transformed to selecting $a_1, a_2, \ldots, a_L$ to minimize Γ, and a Lagrange multiplier method is used for equation (12) to obtain an optimal weight as follows:

$$a_k = \frac{1}{trM_k[n|n]} \Big/ \sum_{k=1}^{L} \frac{1}{trM_k[n|n]} \tag{13}$$

In addition, defining $$\Lambda = \left(\frac{1}{trM_1[n|n]} + \frac{1}{trM_1[n|n]} + L + \frac{1}{trM_L[n|n]}\right)^{-1}$$

and substituting (13) into (8), then an optimal information fusion matrix can be expressed as:

$$\hat{x}_{opt}[n|n] = \sum_{k=1}^{L} \frac{\Lambda}{trM_k[n|n]} \hat{x}_k[n|n] \tag{14}$$

According to (14), an estimated value of a relative skew $\rho^{(AR)}$ between the reference node and the active nodes and an estimated value of a relative skew $\rho^{(AS)}$ between the active nodes and the implicit node after fusion can be obtained. Similarly, the optimal mean square error matrix can be expressed as:

$$M_{opt}[n|n] = \sum_{k=1}^{L} \left( \frac{\Lambda}{trM_k[n|n]} \right)^2 M_k[n|n] \tag{15}$$

Finally, according to an internal relationship (16) of clock skew among the active nodes, the reference node and the implicit node, a relative clock skew $\rho^{(SR)}$ between the reference node and the implicit node can be estimated, and the multi-observation fusion skew tracking of the implicit node is realized.

$$1 + \rho^{(SR)} = \frac{1 + \rho^{(AR)}}{1 + \rho^{(AS)}} \tag{16}$$

FIG. 2 is a flow chart of a weighted observation fusion skew tracking method of the embodiment. The embodiment provides a clock skew tracking method based on weighted observation fusion and timestamp-free interaction, as shown in FIG. 2, specifically comprising the following steps:

P1: Starting a clock skew weighted observation fusion tracking process under timestamp-free interaction.

P2: Listening for multiple pairs of communication messages between the reference node and the multiple active nodes by the implicit node S.

P3: Judging whether the messages are paired; if yes, entering flow P3 to continue the fusion tracking process; otherwise, discarding the unpaired messages and entering flow P2 to continue listening for message information.

P4: Judging whether a synchronization cycle is reached; if yes, entering flow P5; otherwise, entering flow P2 to continue listening for synchronization messages.

P5: Executing L extended Kalman filtering algorithms according to L pairs of synchronization messages overheard.

P6: Executing a scalar weighted minimum variance fusion algorithm according to L skew estimated values obtained by the L extended Kalman filtering algorithms to obtain fused estimated values.

P7: Performing relative skew conversion according to the internal relationship among the reference node, the active nodes and the implicit node.

P8-P9: Calibrating a local clock by the implicit node, and ending the synchronization process.

FIG. 3 gives a performance comparison chart of a clock skew tracking method based on weighted observation fusion and timestamp-free interaction provided by the embodiment. It can be known from FIG. 3 that compared with unfused skew estimated values, the fused estimated values tracks true values more closely and reduces the influence of the active nodes with a relatively large tracking error, which proves that the method of the present invention improves the robustness of timestamp-free skew tracking of the implicit node.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A clock skew tracking method based on weighted observation fusion and timestamp-free interaction, wherein the method is performed by at least one processor of an implicit node S in a wireless sensor network, the method comprising: performing, by the implicit node S based on received wireless communication signals from a reference node R and multiple active nodes, listening synchronization within an overlapping communication range between the reference node R and multiple active nodes $A_1, A_2, \ldots, A_L$, and after multiple pairs of timestamp-free communication messages are successfully overheard, using multiple extended Kalman filtering algorithms to perform weighted fusion of multiple observed values on multiple obtained tracking results based on a scalar weighted linear minimum variance information fusion criterion, and adjusting, based on an estimated relative clock skew, a local clock of the implicit node S to achieve clock synchronization with the reference node R;

wherein according to an internal relationship of clock skew among the active nodes, the reference node and the implicit node, a relative clock skew $\rho^{(SR)}[n]$ between the reference node and the implicit node is estimated, the weighted observation fusion skew tracking of the implicit node is realized, and a specific internal relationship is:

$$1 + \rho^{(SR)} = \frac{1 + \rho^{(AR)}[n]}{1 + \rho^{(AS)}[n]}$$

where $\rho^{(AR)}[n]$ represents a relative clock skew between the active nodes and the reference node, and $\rho^{(AS)}[n]$ represents a relative clock skew between the active nodes and the implicit node;

$$x_k[n] = \begin{bmatrix} \rho_k^{(AS)}[n] \\ \rho_k^{(AR)}[n] \end{bmatrix}$$

wherein calculation formulas of the multiple extended Kalman filtering algorithms are:

prediction: $\hat{x}_k[n|n-1] = A\hat{x}_k[n-1|n-1]$, predicted minimum mean square error matrix: $M_k[n|n-1] = AM_k[n-1|n-1]A^T + C$, -continued $$\text{Kalman gain: } K_k[n] = \frac{M_k[n|n-1]H_k^T[n]}{\sigma_{Z_k}^2 + H_k[n]M_k[n|n-1]H_k^T[n]},$$

$$\text{correction: } \hat{x}_k[n|n] = \hat{x}_k[n|n-1] + K_k[n](Q_k'[n] - h(\hat{x}_k[n|n-1])),$$

$$\text{minimum mean square error matrix: } M_k[n|n] = (I - K_k[n]H_k[n])M_k[n|n-1];$$

where k represents a $k^{th}$ parallel extended Kalman filter executed, $\hat{x}_k[n|n-1]$ is the prediction of $x_k[n]$ by considering a state matrix A and a previous round state $\hat{x}_k[n-1|n-1]$, and $M_k[n|n-1]$ is the predicted minimum mean square error matrix without observation correction; after the Kalman gain $K_k[n]$ is calculated, a corrected estimated value $\hat{x}_k[n|n]$ and $M_k[n|n]$ are obtained, wherein $M_k[n|n]$ is the minimum mean square error matrix of the corresponding relative frequency offset obtained after performing the extended Kalman filter; I represents a unit matrix, H represents an observation matrix, C and $$\sigma_{Z_k}^2$$

are a state covariance matrix and an observation noise variance, $$Q_k'[n]$$

represents an observed value at time n, and $h(\hat{x}_k[n|n-1])$ represents an observed value without noise influence;

wherein the step of performing weighted fusion of multiple observed values on multiple obtained tracking results based on a scalar weighted linear minimum variance information fusion criterion specifically comprises following steps:

S1: calculating an optimal information fusion matrix in the scalar weighted linear minimum variance information fusion criterion, and an expression is:

$$\hat{x}_{opt}[n|n] = a_1\hat{x}_1[n|n] + a_2\hat{x}_2[n|n] + \cdots + a_L\hat{x}_L[n|n]$$

where a represents an estimator component weight; and a fusion weight condition of $a_1+a_2+\ldots+a_L=1$ is obtained based on unbiased estimation;

S2: obtaining an optimal mean square error matrix according to a fusion estimation error, and an expression is:

$$M_{opt}[n|n] = \sum_{k=1}^{L} a_k^2(M_k[n|n])$$

S3: calculating a fusion performance evaluation parameter, and an expression is:

$$\Gamma = trM_{opt}[n|n] = tr\sum_{k,l=1}^{L} a_k a_l(M_{kl}[n|n]) = \sum_{k=1}^{L} a_k^2[tr(M_k[n|n])]$$

where tr represents a trace of the matrix, and $M_{kl}[n|n]$ represents a cross covariance; and a problem of optimal fusion is transformed to selecting $a_1, a_2, \ldots, a_L$ to minimize Γ.

2. The clock skew tracking method as claimed in claim 1, wherein the problem of optimal fusion is solved, wherein $a_1$, $a_2, \ldots a_L$ to minimize Γ, which specifically comprises: using a Lagrange multiplier method to obtain an optimal weight of:

$$a_k = \frac{1}{trM_k[n|n]} \Big/ \sum_{k=1}^{L} \frac{1}{trM_k[n|n]}$$

defining $$\Lambda = \left(\frac{1}{trM_1[n|n]} + \frac{1}{trM_1[n|n]} + \ldots + \frac{1}{trM_L[n|n]}\right)^{-1},$$

then the optimal information fusion matrix is expressed as:

$$\hat{x}_{opt}[n|n] = \sum_{k=1}^{L} \frac{\Lambda}{trM_k[n|n]}\hat{x}_k[n|n]$$

the optimal mean square error matrix is expressed as:

$$M_{opt}[n|n] = \sum_{k=1}^{L}\left(\frac{\Lambda}{trM_k[n|n]}\right)^2 M_k[n|n].$$

* * * * *